United States Patent

[11] 3,616,090

| [72] | Inventor | Charles L. Larson |
| | | Grants Pass, Oreg. |
| [21] | Appl. No. | 710,346 |
| [22] | Filed | Mar. 4, 1968 |
| [45] | Patented | Oct. 26, 1971 |
| [73] | Assignee | Jeddeloh Bros. Sweed Mills, Inc. |
| | | Gold Hill, Oreg. |

[54] APPARATUS FOR LAYING UP PLYWOOD PANELS
6 Claims, 3 Drawing Figs.

[52] U.S. Cl............................................. 156/559,
156/313, 156/557, 156/563, 156/566
[51] Int. Cl........................................................ B32b 31/04
[50] Field of Search........................................... 156/313,
563, 566, 559 I, 556, 557, 539; 198/178, 179

[56] References Cited
UNITED STATES PATENTS

| 3,367,823 | 2/1968 | Clausen et al. | 156/559 |
| 3,437,545 | 4/1969 | Bacon | 156/559 |
| 3,483,065 | 12/1969 | O'Brien | 156/563 |
| 2,919,732 | 1/1960 | McKean et al. | 156/566 |
| 2,971,633 | 2/1961 | Geoffroy | 198/178 |
| 3,084,090 | 4/1963 | Rambo et al. | 156/566 |
| 3,139,369 | 6/1964 | Sullivan et al. | 156/563 |
| 3,322,592 | 5/1967 | Preusser et al. | 156/563 |
| 3,344,503 | 10/1967 | Merritt | 156/563 |
| 3,384,137 | 5/1968 | Ash | 156/313 |

*Primary Examiner*—Carl D. Quarforth
*Assistant Examiner*—F. M. Gittes
*Attorney*—Kolisch & Hartwell

ABSTRACT: Apparatus for laying up plywood panels including a pair of parallel conveyor lines for moving two series of presized veneer sheets in a common direction, and core sheet conveyor means including an adhesive applicator for preparing core sheets with adhesive coatings on both faces and transferring such core sheets to positions on top of the presized sheets to form two-ply combinations on each conveyor line. Transfer means at a transfer station adjacent the downstream ends of the conveyor lines transfers two-ply combinations from one conveyor line to the other. At this transfer station presized veneer covering sheets are laid over the two-ply combinations, interspersed with transferred two-ply combinations to form three-ply, five-ply, etc., plywood panels, as desired.

Charles L. Larson
INVENTOR

PATENTED OCT 26 1971 3,616,090
SHEET 2 OF 2
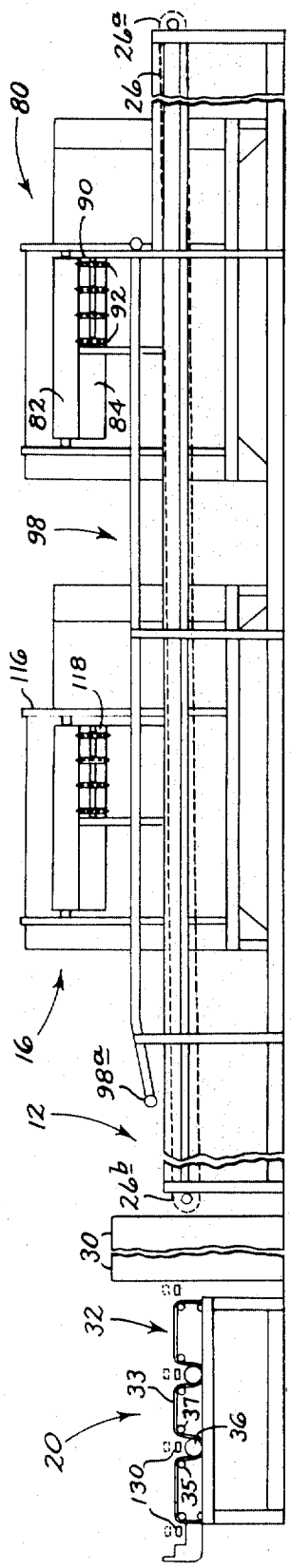
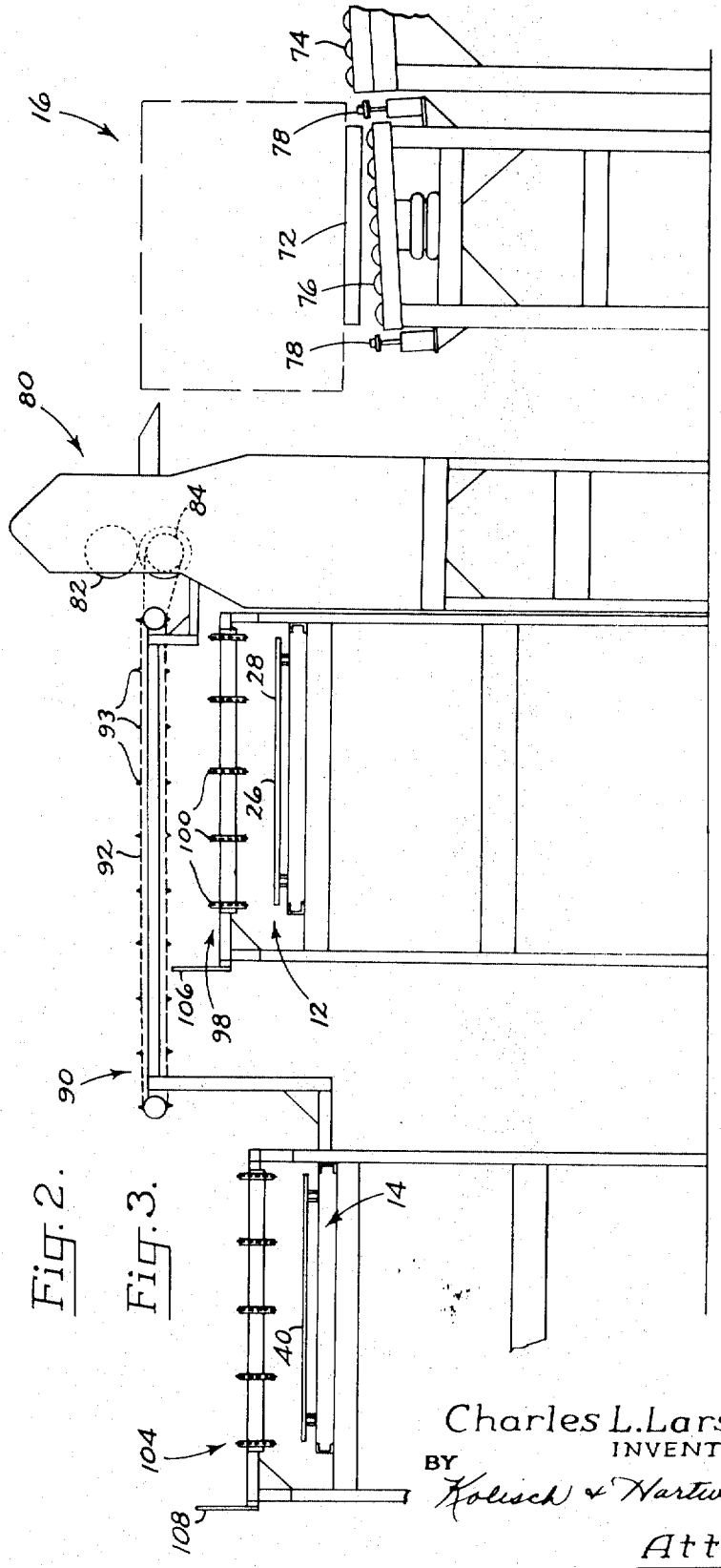
Fig. 2.
Fig. 3.
Charles L. Larson
INVENTOR
BY Kolisch & Hartwell
Attys.

APPARATUS FOR LAYING UP PLYWOOD PANELS

This invention relates to an apparatus for laying up plywood panels.

Plywood panels are produced by assembling multiple layers of veneer sheets, with the grain of each layer disposed at an angle with respect to the grain of the layers directly adjacent. Usually a minimum of three layers or plys are prepared, but more may be added to increase the thickness and strength of the resultant panel. The outermost sheets of the panel, i.e., faces and backs (and center sheets in the case of for instance, a five-ply panel) are presized before layup to have roughly the full width and length of the panel which is to be produced. The core sheets or pieces, which are sandwiched between the faces and backs, and have grain extending across the width of the panel, generally have sufficient length to span the width of the panel, but a width which is considerably less than the length of the panel. Therefore, multiple core pieces usually need to be laid down to form a ply which is coextensive with the length of the panel.

In the past, the layup of plywood panels has been accomplished primarily on a stationary table, with four or more men working to produce one panel at a time. The type of process used has resulted in wasted manhours, since during the layup process at least one man will be idle while others perform the tasks assigned to them. The manhandling of the veneer sheets required has resulted in wasted effort.

A general object of the invention is to provide novel apparatus which permits the laying up of plywood panels in a continuous type of process.

A related object is to provide apparatus which permits a substantial increase in the panel output obtainable from a given number of men.

Another object is to provide apparatus for laying up plywood panels which includes an elongated conveyor for transporting presized veneer sheets such as those used for faces and centers, and a conveyor system for handling core pieces which delivers these core pieces in proper position for superposition on the presized sheets.

A further object of the invention is to provide novel apparatus for laying up plywood panels which includes a pair of substantially parallel elongated conveyors used in transporting full-size veneer sheets such as faces or centers so organized that subassemblies of two-ply combinations can be prepared on the conveyors which may then be completed into three-ply panels or consolidated to form panels of a greater number of plys.

Another object of the invention is to provide a novel method for laying up plywood panels, wherein presized veneer sheets are moved in a common direction along side-by-side flow paths, core sheets are superposed over the presized veneer sheets on each flow path to form two-ply combinations on both flow paths, and two-ply combinations are transferred from one of the flow paths to a position overlying two-ply combinations on the other flow path to form multiple-ply panels on said other flow path.

These and other objects and advantages will become apparent as the following description is read in conjunction with the drawings, wherein:

FIG. 2 is a side elevation view, somewhat enlarged, taken generally along the line 2-2 in FIG. 1, the apparatus having been shortened by the removal of portions; and FIG. 3 is an end elevation view, further enlarged, taken generally along the line 3-3 in FIG. 1.

Figure 1:
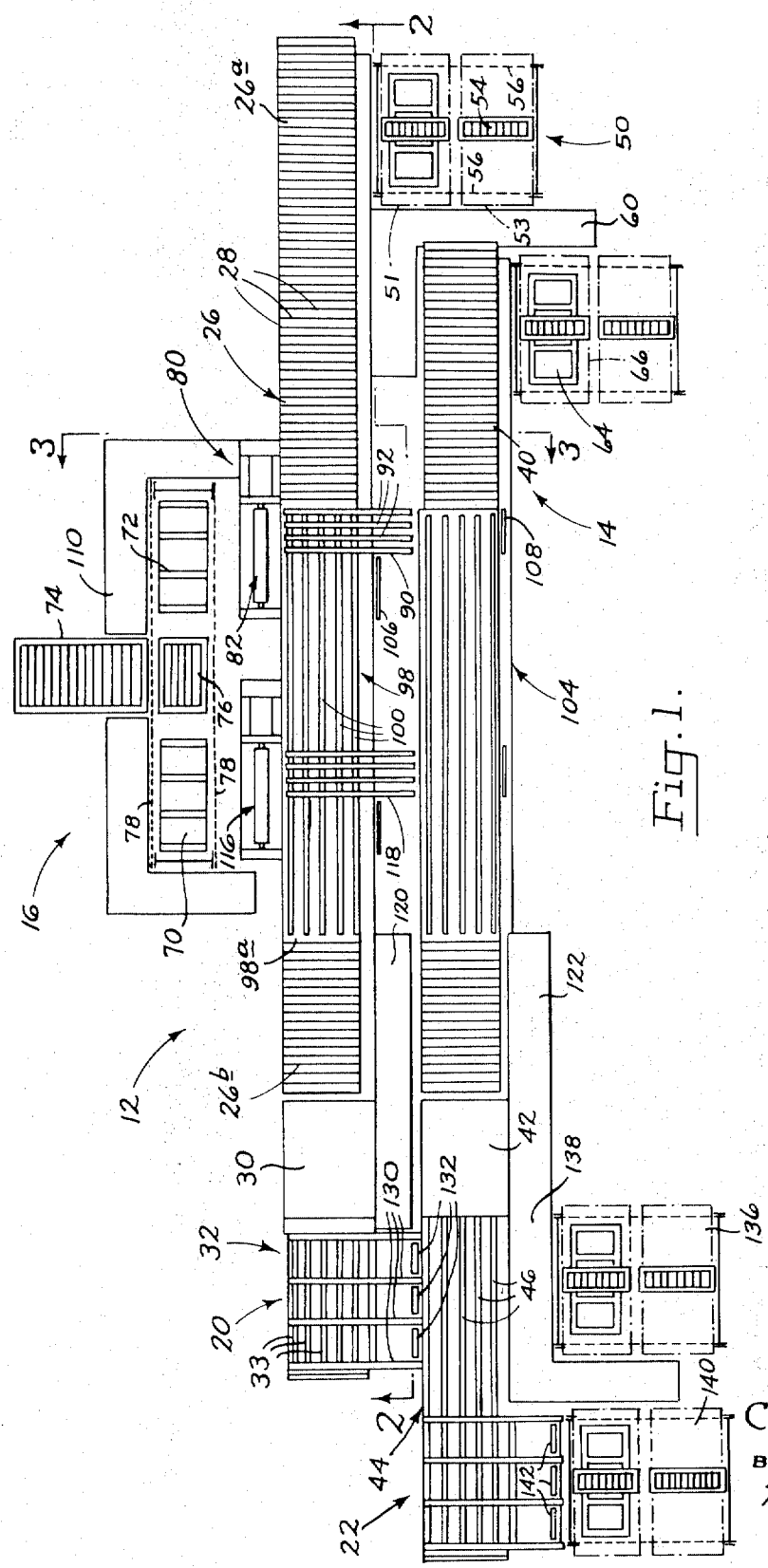
FIG. 1 is a top plan view, somewhat simplified, of plywood panel layup apparatus constructed in accordance with an embodiment of the invention.

Referring now to the drawings, and first more particularly to FIG. 1, at 10 is indicated generally apparatus for laying up plywood panels which comprises broadly a pair of parallel, elongated conveyor lines 12, 14, core sheet supply means 16 positioned to one side of the conveyor lines intermediate their upstream and downstream ends, and side-shifting transfer units 20, 22, adjacent the downstream ends of the conveyor lines used in consolidating the output from the conveyor lines and removing work from line 14.

Considering first of all conveyor line 12, this includes an elongated conveyor 26 which extends a major portion of the length of the conveyor line. The conveyor may comprise what is known as a flattop type of conveyor and thus includes multiple elongated flat pads, such as those shown at 28 which extend transversely of the conveyor, are mounted on the usual conveyor chain, and provide the actual support for the veneer transported. In order to condense the drawings to a size where a substantial part of the apparatus is illustrated in a Figure it was necessary to eliminate much of the detailed construction of the conveyor. In FIGS. 1 and 2 the feed end of the conveyor is shown at 26a and the discharge or downstream end at 26b. In FIG. 1 a portion of the conveyor between its ends is obscured by reason of the presence of overlying conveyor structure which will be described later.

Further considering conveyor line 12, shown in simplified form at 30 downstream from the discharge end of conveyor 26 is a clipper which is utilized in the clipping of core pieces. While details of the clipper are not indicated, it should be understood that the clipper may be conventional and that it includes a vertically movable knife which can be brought down and in coaction with a supporting anvil is used to sever a core piece. The clipper may further include a conveyor section used in transporting work through the clipper and this conveyor section functions as a continuation of conveyor 26 in conveyor line 12.

Downstream from the clipper in FIGS. 1 and 2, and also part of conveyor line 12, is a terminal conveyor section 32. This conveyor section may comprise multiple laterally spaced belts such as those shown at 33, trained over the usual rolls or pulleys. As perhaps best illustrated in FIG. 2, the upper reach of each belt 33 is trained downwardly in depending loops at two locations between the extremities of the upper reach utilizing a pulley system such as that shown in FIG. 2 including pulleys 35, 36, 37. This is done to permit the inclusion of a transfer unit at the offbearing end of conveyor line 12, utilized in transferring work laterally off to one side of the conveyor line. Details of this transfer unit are discussed later in the specification.

A suitable motor drive system is provided for conveyor line 12 whereby conveyor 26, the conveyor mechanism of clipper 30 and the terminal conveyor section 32 are driven in unison and in a manner producing movement of work from the feed to the discharge end of the conveyor line, or from right to left in FIGS. 1 and 2.

Conveyor line 14 is somewhat similar to conveyor line 12 just described. Thus, conveyor line 14 includes a conveyor 40 which extends a major portion of the length of the line and may be a flattop conveyor similar to conveyor 26. Downstream from the discharge end of conveyor 40 is a clipper 42, similar to clipper 30 earlier described. Downstream from the clipper is a terminal conveyor section 44, including multiple laterally spaced belts 46, similar to belts 33, but in this instance somewhat longer so as to be able to transport work to a position somewhat beyond the extreme end of terminal conveyor section 32.

Presized veneer sheets, such as faces, backs or centers, are removed from appropriate stacks of such sheets and placed on conveyor lines 12, 14 adjacent their feed ends. Thus, and considering conveyor line 12, a stack support is shown at 50 which may take the form of a conventional scissor lift hoist adapted to support a stack of veneer such as the stack indicated in dot-dashed outline at 51. A reverse stack of presized veneer, indicated in dot-dashed outline at 53, ordinarily is held in readiness for transfer onto the scissor lift hoist as by supporting it on a roll case shown generally at 54, the latter being a conventional unit including rollers for conveying the stack along the length of the roll case. Indicated in outline at 56 are transfer chains which support the ends of the stack and when operated serve to move under power the reserve stack onto the stack support.

A workman stationed on platform 60 may take presized veneer sheets from the top of stack 51 and place each sheet on conveyor line 12 with the longest dimension of the sheet generally paralleling the longitudinal axis of the conveyor line. With such presized sheets usually having grain which parallels the longest dimension of the sheet, this means that the grain of the presized sheet on the conveyor line extends generally in the direction of the conveyor line.

Considering conveyor line 14, a similar stack support, or scissor lift hoist, is shown at 64 for supporting a stack indicated in dot-dashed outline at 66. The same workman who deposits sheets on conveyor line 12 also deposits sheets in a similar fashion on the feed end of conveyor line 14.

Core sheet supply means 16 is located laterally off to one side of the conveyor lines, more specifically, immediately laterally adjacent conveyor line 12 at a point intermediate the ends of conveyor 26 in this conveyor line.

Considering in more detail the core sheet supply means, shown at 70 and 72 are a pair of stack supports which also may be scissor lift hoists similar to stack support 50 earlier discussed. These are for supporting a stack of veneer of the type ordinarily used as core pieces, the core pieces in this instance having a length which is roughly the width of the panel to be produced, but a random width which is only a minor portion usually of the full length of the panel. To transport a stack of veneer onto a stack support, the veneer stack is deposited on a roll case conveyor 74 and is moved on this conveyor onto a roll case conveyor 76. Roll case conveyor 76 is lowerable to deposit such a stack on transfer chains, such as those shown at 78, and these chains may be operated to shift the stack either over support 70 or support 72.

A core sheet conveyor means is provided to transfer core pieces from the stack onto conveyor lines 12 or 14. Specifically, and considering the way that a sheet is conveyed onto conveyor line 12, indicated at 80 is an adhesive applicator or coater, of conventional construction. As can be seen with reference to FIGS. 2 and 3, the applicator includes opposed rolls 82, 84 and includes a construction whereby adhesive is continuously deposited on the surfaces of these rolls. The rolls are rotated under power in a direction to cause a transfer of a core piece passed through the rolls forwardly toward the conveyor lines.

As perhaps best illustrated in FIGS. 1 and 3, a conveyor section is provided in front of the adhesive applicator, more specifically in front of the right-hand extremities of rolls 82, 84 in the coater in FIG. 1, which is indicated at 90. The conveyor section comprises multiple chains 92 with upper reaches in a plane which is substantially at the height of the nip of rolls 82, 84 (see FIG. 3). The chains have teeth, or projections, 93 projecting outwardly from the main body of the chains and it is the extremities of these teeth which provide support for the bottom face of a core piece transferred forwardly by the coater when such core piece is directed to the right-hand extremities of the coater rolls in FIG. 1. The conveyor section is suitably driven under power and serves to transfer core pieces when fed between these right-hand extremities of the rolls over conveyor line 12 and thence to eject these pieces over conveyor line 14.

An elevated conveyor section 98 is disposed over conveyor line 12 and substantially parallels it. This conveyor section comprises multiple laterally spaced-apart chains 100 suitably trained over pulleys or sprockets and rotated under power. The chains may be similar to chains 92 and include teeth projecting outwardly therefrom for the purpose of supporting the bottom face of a veneer sheet deposited thereon. The conveyor section will transport such veneer from right to left in FIG. 1, to a discharge end for the conveyor section which is shown at 98a. A similar elevated conveyor section 104 is provided extending over the top of conveyor line 14.

Referring to FIGS. 1 and 3, a fence is shown at 106 located in front of the left-hand extremities of rolls in the coater in FIG. 1, but on the opposite side of the elevated conveyor section from the coater. A fence 108 is shown located in front of the right-hand extremities of the coater rolls (and in front of conveyor section 90), but located on the opposite side of conveyor section 104 from conveyor section 90. These fences are to stop forward progress of core pieces moved forwardly thereagainst on leaving the coater.

Explaining how core pieces are fed into the apparatus, an operator standing on platform 110 advances core pieces between the rolls of the coater. These core pieces which have a length roughly equal to the width of the finished panel travel longitudinally between the rolls of the coater. A core piece advanced through the left-hand extremities of the rolls in FIG. 1 is ejected forwardly to have its forward end come against fence 106. The fence stops forward movement and causes the piece to drop onto elevated conveyor section 98 with the piece extending generally transversely of the conveyor section. On the other hand, a core piece advanced through the right-hand extremities of the rolls in the coater in FIG. 1 is deposited by these rolls on conveyor section 90. Conveyor section 90 in turn transports such a core piece over elevated conveyor section 98 and ultimately discharges this piece against fence 108 where it drops onto elevated conveyor section 104. In this way, two flow courses are defined for core sheets downstream from the applicator, or coater, one of which supplies sheets to elevated conveyor section 98 for conveyor line 12, and the other of which supplies sheets to elevated conveyor section 104 for conveyor line 14.

Referring to FIGS. 1 and 2, it will be noted that an additional coater is shown at 116 in front of stack support 70. Associated with the right-hand extremities of the rolls in this coater is a conveyor section 118 similar to conveyor section 90 earlier described. Coater 116 may be used in lieu of coater 80 when it is desired to clean or repair coater 80. In this way, a more continuous type of operation is assured.

It will be noted that platforms 120 and 122 are provided located to one side of conveyor lines 12 and 14, respectively, adjacent the offbearing or discharge ends of elevated conveyor sections 98 and 104. These platforms are to support workmen stationed adjacent the offbearing ends of elevated conveyor sections 98, 104 who remove adhesive-coated core pieces and place these core pieces on the presized veneer sheets traveling under the discharge ends of the elevated conveyor sections on conveyor lines 12, 14, respectively to produce assemblies of veneer sheets with overlying core sheets.

Earlier, depending loop portions were described in connection with belts 33 of terminal conveyor section 32 which are present to accommodate a transfer unit mechanism designated generally at 20. Further describing this transfer unit mechanism, indicated schematically at 130 are a series of laterally spaced elongated horizontal arms, also referred to herein as veneer sheet-engaging means, which have a lowered retracted position as generally indicated in FIG. 2 where their upper surfaces are slightly below the support plane of the terminal conveyor section 32. As shown in dotted outline in FIG. 2, these arms may a raised retracted position raised to be elevated well above the support plane of terminal conveyor section 32 with a portion of the arms being adapted to engage the underside of a veneer sheet and raise it off belts 33. The transfer unit includes mechanism (not shown) which can be actuated to shift the arms longitudinally when raised whereby they end up in a raised extended position with the veneer-engaging position of the arms extending over the terminal conveyor section 44 of conveyor line 14. Referring to FIG. 1, shown at 132 are a series of aligned abutments which project upwardly somewhat from the plane defined by terminal conveyor section 44 and are located between arms 130. With the arms extended and assuming that a presized piece of veneer has been carried by the arms to a position overlying terminal conveyor section 44, on dropping of the arms abutments 132 will pass up between the arms behind the trailing edge of the presized veneer piece just transported over terminal conveyor section 44. Retraction of the arms toward their lowered retracted position will then cause any work, such as the presized veneer sheet carried by the arms, to be deposited on the terminal conveyor section 44 with abutments 132 preventing the work from returning with the arms. The transfer unit thus is able to side-shift an assembly of a veneer sheet with overlying core sheets as such is oriented on the one conveyor, from the one conveyor to the other conveyor.

Again referring to FIG. 1, a stack support 136 is shown similar to stack support 50 utilized to hold a stack of presized veneer pieces which are to be incorporated into the panels produced for the apparatus. Veneer is removed from a stack on support 136 by an operator working on platform 138.

Adjacent the offbearing end of terminal conveyor section 44 is another transfer unit 22 which is similar to the transfer unit 20 just described. This transfer unit is employed in removing completed assembled panels from conveyor line 14 and depositing these panels on a stack support 140. Abutments 142 function to permit the arms to be withdrawn from a panel deposited by the arms on stack support 140 in the same manner as was described in connection with abutments 132.

With the apparatus described, plywood panels of three, five, seven or more plys may be assembled utilizing five operators and with all such personnel operating substantially continuously. Thus, typically one man can be placed at the feed end of conveyor lines 12, 14 for keeping these feed ends charged with presized veneer sheets removed from stack supports 50, 64. Another operator could be stationed on platform 110 for the purpose of feeding core pieces to the coater with such core pieces being deposited on elevated conveyor sections 98, 104. A pair of men stationed on platforms 120, 122, respectively, may be utilized in transferring core pieces from the elevated conveyor sections onto the conveyor lines 12, 14 which pass underneath their discharge ends. A final operator could be stationed on platform 138 for the purpose of finally assembling the panels as will be described hereinafter.

With the complement of men described working the apparatus, it is contemplated that the men on platforms 120, 122 control the forward progress of the elevated conveyor sections 98, 104, respectively, through the operation of suitable control circuits serving to stop forward movement of these elevated conveyor sections when it is desired to stop the feed of core pieces. The operator of the coater stands in a position where he can see the loading of the elevated conveyor sections that pass in front of him and he feeds core pieces to the coater as required to keep the elevated conveyor sections filled with core pieces. Transfer units 20, 22 are controlled by the operator standing on the platform 138 to produce lateral shifting of work from the respective conveyor lines. It is contemplated also that an automatic control system would be included, to stop forward progress of conveyor lines 12, 14 when necessary to prevent jamming of the discharge ends thereof.

Explaining generally the operation of the apparatus, as already indicated a workman standing on platform 60 places presized veneer sheets having roughly the dimensions of a finished panel on conveyor lines 12 and 14. These presized sheets are oriented so that the grain of the sheets extends generally in the direction of the conveyor lines. Core pieces have glue coatings applied to opposite faces on passing through the applicator, or coater, and are discharged onto either elevated conveyor section 98 or elevated conveyor section 104, depending upon which side of the glue coater they pass through. These core pieces which are transported by the elevated conveyor sections in a direction extending transversely of the grain of the core pieces are carried to the workmen on platforms 120, 122 who place the core pieces on the top faces of the presized sheets traveling beside them on conveyor lines 12, 14. On traveling toward the clippers, therefore, two-ply combinations are formed, each comprising a presized veneer sheet having core pieces extending over it with grain extending at right angles to the grain of the presized veneer sheet. The two-ply combinations on moving farther downstream and into the clippers are trimmed, with the clipper serving to trim any excess of core material extending over forward and rear ends of the underlying presized veneer sheet. A workman located on platform 138 is permitted, with the apparatus described, to assemble either three-ply, five-ply, seven-ply, etc. plywood panels from those supplied to him on conveyor lines 12, 14.

Describing first of all the manufacture of a three-ply panel, the operator places a presized covering veneer sheet from a stack supported on support 136 on top of each two-ply combination which travels before him on conveyor line 14. In the case of two-ply combinations traveling down conveyor line 12, the operator actuates transfer unit 20 to transfer each of these two-ply combinations laterally from this conveyor line to a position in front of him on conveyor line 14. Such two-ply combinations may be completed into a three-ply panel by the workman placing a presized covering veneer sheet on top of each two-ply combination which is thus transferred in front of him.

Describing the manufacture of a five-ply panel, the workman on platform 138 transfers a two-ply combination from conveyor line 12 to a position overlying each two-ply combination traveling in front of him on conveyor line 14. This results in the production of a four-ply combination comprising a presized veneer sheet on the bottom, a layer of core pieces, another presized veneer sheet and a top layer of core pieces. The workman completes the assembly of the panel by placing a presized covering veneer sheet from a stack supported on stack support 136 on top of the four-ply combination.

To produce a panel having an even greater number of plys, i.e., a seven-ply panel, the operator on platform 138 stacks two two-ply combinations from conveyor line 12 on top of each two-ply combination traveling in front of him on conveyor line 14. With placement of a presized covering veneer sheet on top of this assembly, a seven-ply panel is produced. Obviously, it is a simple matter to change the manufacturing procedure to increase the number of plys resulting in the final panel product.

It will be seen that by including two conveyor lines which extend side-by-side through the apparatus, exemplified by lines 12, 14, a number of advantages are possible. For one thing, it is a relatively easy matter for one workman to see that both of the conveyor lines are supplied with presized veneer sheets at the feed ends thereof. Furthermore, a single operator is permitted to supply core pieces to both of the conveyor lines from a station located laterally to one side of one of the lines. The same coater can be used in supplying adhesive-coated core pieces for both conveyor lines. Perhaps the most significant feature is that in the assembly of panels a great deal of flexibility is permitted in the type of panel that is provided through suitably consolidating the output of the two conveyor lines adjacent their discharge ends. Thus, it is a function of how many two-ply combinations are transferred from conveyor line 12 to conveyor line 14 before the placement of a covering presized veneer sheet which determines the total number of plys that are built up in the finished panel.

While a specific embodiment of the invention and certain procedures in which the apparatus may be utilized in the assembly of plywood panels have been described herein, it is appreciated that various changes may be made in the apparatus and the procedures used without departing from the inventive concepts herein disclosed. Accordingly, it is desired not to be limited than otherwise as required by the appended claims.

It is claimed and desired to secure by letters Patent:

1. Apparatus for laying up plywood panels comprising
   a first power-driven elongated conveyor line for supporting the underside of a first series of veneer sheets and moving them in one direction along a path,
   a second power-driven elongated conveyor line beside the first conveyor line for moving another series of presized veneer sheets in said one direction,
   a core sheet supply located laterally to one side of both of said conveyor lines,
   core sheet conveyor means extending from said core sheet supply and operable to move core sheets transversely of and over each of said conveyor lines for superposing core sheets over presized veneer sheets on each conveyor line to produce assemblies of veneer sheets with overlying core sheets, and
   power-operated side-shifting transfer means adjacent the downstream end of said first conveyor line for side-shifting such an assembly as such is oriented on said first conveyor line from said first to said second conveyor line, said transfer means comprising veneer sheet-engaing means mounted for movement between a lowered position disposed below the level of said path and a raised position extending above the level of said path whereby it may engage the underside of a veneer sheet and raise it off the first conveyor line, and mechanism operable to shift the veneer sheet in its raised position laterally from said first to said second conveyor line.

2. The apparatus of claim 1, wherein said veneer sheet engaging means comprises a substantially horizontal arm extending transversely of said path and mounted for movement sequentially in a course between a lowered retracted position directly beneath said path, a raised retracted position disposed above said path with a portion of said arm adapted to engage the underside of a veneer sheet and raise it off the conveyor, a raised extended position where the portion of said arm adapted to support a veneer sheet is disposed over the other conveyor line, and thence back to said lowered retracted position.

3. The apparatus of claim 2, which further comprises an abutment disposed between said conveyor lines in a position to engage a veneer sheet on movement of the arm from its raised extended to its lowered retracted positions to prevent such sheet from following the arm, whereby the veneer sheet is moved off the arm.

4. The apparatus of claim 1, wherein said core sheet conveyor means further comprises an elevated conveyor section spaced above each conveyor line which parallels and is operable to move core sheets in said one direction toward the downstream end of the conveyor line.

5. The apparatus of claim 1, wherein said core sheet conveyor means further comprises an adhesive applicator with two flow courses for core sheets defined downstream from the applicator.

6. The apparatus of claim 5, wherein one of said flow courses is defined by elongated conveyor chains extending over one conveyor line and having multiple spaced-apart vertical projections adapted to support the core sheets with the bottom faces of the sheets resting on the tops of said projections.

* * * * *